Aug. 18, 1959             C. C. MISFELDT             2,899,727

MOLDED STRUCTURES AND METHOD FOR FORMING SAME

Filed Jan. 11, 1957             3 Sheets-Sheet 1

INVENTOR.
CHARLES C. MISFELDT

HIS ATTORNEYS

CHARLES C. MISFELDT
INVENTOR.

HIS ATTORNEYS

United States Patent Office 2,899,727
Patented Aug. 18, 1959

2,899,727

MOLDED STRUCTURES AND METHOD FOR FORMING SAME

Charles C. Misfeldt, Phoenix, Ariz.

Application January 11, 1957, Serial No. 633,727

9 Claims. (Cl. 22—193)

This invention relates to a method and process of forming structural members of high strength and light weight, and particularly to monocoque members suitable for airfoils and other aircraft parts, marine structures, automotive parts and other analogous uses where maximum strength must be combined with minimum weight.

The severest requirements for the properties mentioned arise in connection with airfoils, and hence this specification will be directed more specifically to such structures and methods for forming them, but it will be obvious that structures which will meet the demands of such usage are also applicable to conditions where the requirements are less rigorous.

Among the objects of this invention are: to provide a method of forming structural elements of high strength-to-weight ratio and great rigidity; to provide structural members of exact contour, and which are not liable to local deformation under stress; to provide monocoque structural elements which are reinforced along geodesic lines without undue complexities of manufacture; to provide members which can be formed into structures of a minimum number of parts with correspondingly low manufacturing and maintenance costs; to provide members in which the principal stress bearing elements and all necessary reinforcement are integral; and to provide a method whereby the advantages of casting or other molding processes may be utilized in forming light, skin-stressed structures. Other objects and features of advantage may become apparent by reference to the ensuing description and the appended drawings, wherein:

Figure 1:
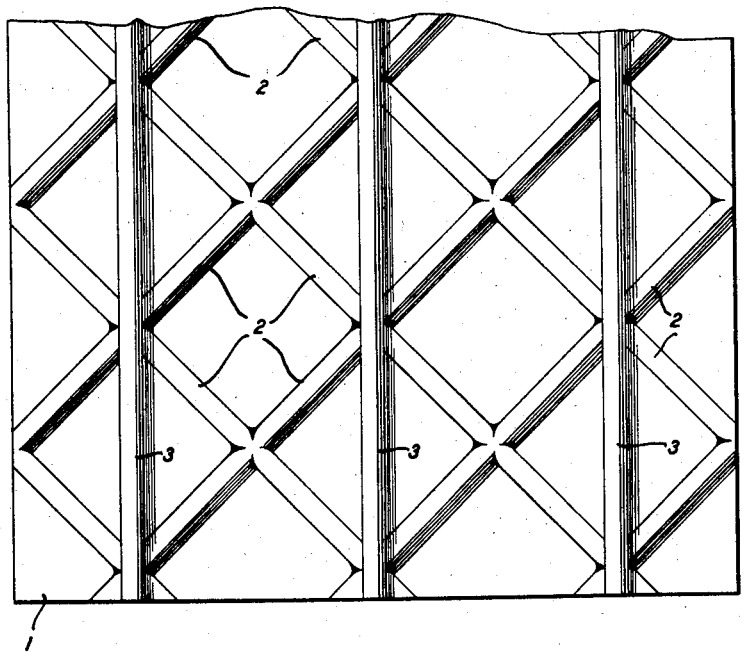
Fig. 1 is a plan view of a test panel, such as is customarily used in predetermining the stress-strain characteristics of airfoils, made in accordance with this invention.

Monocoque or stressed skin construction is widely used in modern aircraft. As so used it has been found necessary to modify the principle somewhat, for the thin skin, necessary for lightness, while capable of carrying all tensile stresses, is too flexible in itself to carry the compression and therefore stiffeners are used for this purpose, and spars, ribs or both are provided to carry shear. In the prior art the thin skin has been fastened to these members by rivets or welding, and because of the small size and fraility of the parts, considered individually, this results in exceedingly complex structures, with thousands of rivets, or long welded seams, either of which cause local deformation of the perfectly smooth surface desired. Air pressure also can cause local deformation of the skin Such deformations tend to break up laminar flow of air and cause turbulence, which greatly increases skin friction from 30 fold to many times this value. Since this effect becomes more pronounced as speed increases, and as aircraft and guided missile supersonic speeds are reached, and even exceeded, it becomes more and more important that all equipment designed for these supersonic speed ranges shall be characterized by having its various parts completely streamlined, which is realized by this invention in the process of fabrication.

In such designs every effort is made to secure rigidity both as regards resistance to local deformation and with respect to major flexures. In accordance with this present invention this rigidity and the equally important smooth, accurate contour are attained by casting, extruding or otherwise molding the structures in large sections as, for example, the upper and lower halves of an entire wing.

That such a procedure has not been attempted in the past has been due to a number of factors: first, the great difficulty of obtaining uniform thin sections of large area by such processes and the metal chilling before the molds are filled. Second, cast structures are notoriously heavy (largely because of the factor first mentioned) and a high strength-to-weight ratio is a prime desideratum in airplane construction. A third reason can probably best be explained as a trend or fashion. Sheet metal construction, especially welded construction, has proved so valuable in lightening and strengthening many types of equipment, from electric motors to kitchen ranges, that it is the obvious engineering choice.

The product of the present invention is a monocoque, modified in much the same degree as are the now conventional sheet metal structures. Broadly, the method of construction comprises forming a mold (which may be of dry sand, graphite, plaster or other composition, or of metal) for the skin, which is of such section as to carry the major portion of the tensile stresses. Intersecting channels are formed in the mold which divide the skin or plate into small areas and these channels are preferably arranged along geodesic lines of the surface and are so formed that when filled they constitute reinforcing elements of graduated size; first mere beads intersecting to form a net, then in increasing size, stringers, ribs and, if necessary, spars, each set intersecting that of smaller size. Pencil-like vents or risers are provided for the escape of air or other gases, the mold is heated, preferably electrically, to a degree but slightly below the fusing point of the alloy, and the molten or plasticized metal is flowed, poured or injected through a gate or gates located at the largest of the reinforcing elements. The pencil-like riser also may serve as a reservoir of molten, plasticized or flowing metal or alloy at the top of a section or sections of the casting. It is thus designed to supply metal to compensate for shrinkage that cannot readily and properly be fed from the gate. In addition, the so-called riser, as used and described with respect to this invention, serves to provide the medium by which surface tension on the incoming flowing metal is broken as the metal enters. This effect permits an unrestricted flow of metal into the mold particularly in large areas where extremely thin sections are to be formed. The pencil-like riser is heavy only in relation to the section to which it is attached for venting, feeding the compensating metal, and breaking surface tension for better flow, feed and distribution into the mold.

After the mold is filled with the metal in its flowing, plasticized or molten state the mold temperature is reduced very gradually, which may be done either continuously or by steps, which prevents hot tears in the thin sections and results in a substantially normalized metal of uniform grain size. The mold can then be removed or collapsed, the gates and risers cut off and smooth, and the result is a complete structural member, with all necessary reinforcement integral therewith.

This invention, it will be appreciated, is concerned, primarily with the casting, molding or extruding of structures in either large or small sections formed primarily of non-ferrous alloys. In considering the invention in its primary relationship to the non-ferrous alloys, since the thermal characteristics of non-ferrous alloys are not necessarily identical to ferrous alloys, for example, modified terminology must be contemplated because it is very rare for a non-ferrous alloy to be considered as having a transformation point, as do the ferrous alloys. Under the circumstances, many of the strictly technical definitions and terms customarily thought of in relation to ferrous alloys will herein be considered with modified meanings. Within this interpretation it will be considered and understood that the non-ferrous metal can be and is "normalized," that is, returned to "normal" within the usual meaning of the term and freed from internal stresses so that there is a control and equalization of the crystalline grain structure thereof. This is accomplished usually through artificial aging (giving, of course, higher yield values and no distortion) occurring as a part of the operation in which the structure is formed. Temperatures and time periods are usually established empirically for various alloys and section thicknesses and depend to a great extent upon the mass and volume, as well as the selected alloy and the mold in which the formed component is prepared.

Accordingly, as the term "normalizing" is used in this description and specification in its reference to non-ferrous alloys it will be understood to describe a process in which a non-ferrous alloy is heated to a specified temperature and over a selected time cycle for the purpose of stress relief combined with artificial aging accomplished at the same operation, following which it is cooled usually to room temperature. Then, the formed component may be re-heated within the mold to a relatively high temperature, but to one which is well below the flowing or plasticizing point of the particular alloy being used, and then rapidly cooled to temperatures considerably below zero degrees Fahrenheit. These re-heating and cooling steps may be achieved within the mold, as will later be explained, or they may be practiced after the formed component has been removed from the mold. In the latter case, inductive heating practices are followed to raise the temperature of re-heating of the formed component after which it is immediately quenched into deep freeze to be cooled at rates or speeds and to desired temperatures below zero found by experimentation to be particularly suitable for the chosen non-ferrous alloy of the particular shapes and mass being normalized. However, depending upon the alloy the reduction of temperature below room temperature may be gradual or sudden and under some conditions the deep freeze treatment may not be required. It is significant, however, that the "normalizing" process as here defined serves to relieve stress and provide higher yield values without distortion and provides refinement of the grain boundaries.

Figure 2:
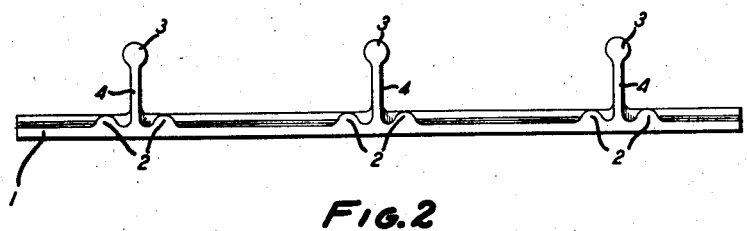
Fig. 2 is an elevation of the panel of Fig. 1, which shows a transverse section thereof.

This may be better understood by reference to Figs. 1 and 2, which illustrate a test panel, such as is customarily used in determining deflection and yield point coefficients for use in designing aircraft structures. This panel comprises a plate 1, corresponding to the skin of an airfoil. The plate is reticulated by a series of intersecting diagonally disposed beads 2, which divide its inner surface into small areas; in this case squares of 4 inches on the diagonal, or about 2 13/16 inches on a side. The beads are most effective if of semi-circular section, as shown, since this gives the maximum ratio of cross section to surface, but this form can be modified if desired without departure from the spirit of the invention.

Intersecting the beads, and preferably at their own intersections, is a series of larger reinforcing elements or stringers. In order to serve their dual purpose as filling channels and stiffeners for the final structure these are preferably of bulb T-section, comprising a bulb 3 and web 4. The web is filleted into the plate and the beads as indicated, which not only avoids stress concentrations but aids in pouring. For best results the beads make equal angles with the stringers, and the areas defined by them are approximately squares, although they may be rhomboidal if this gives a closer approximation to the geodesic lines of stress in the particular structure under consideration.

Figure 3:
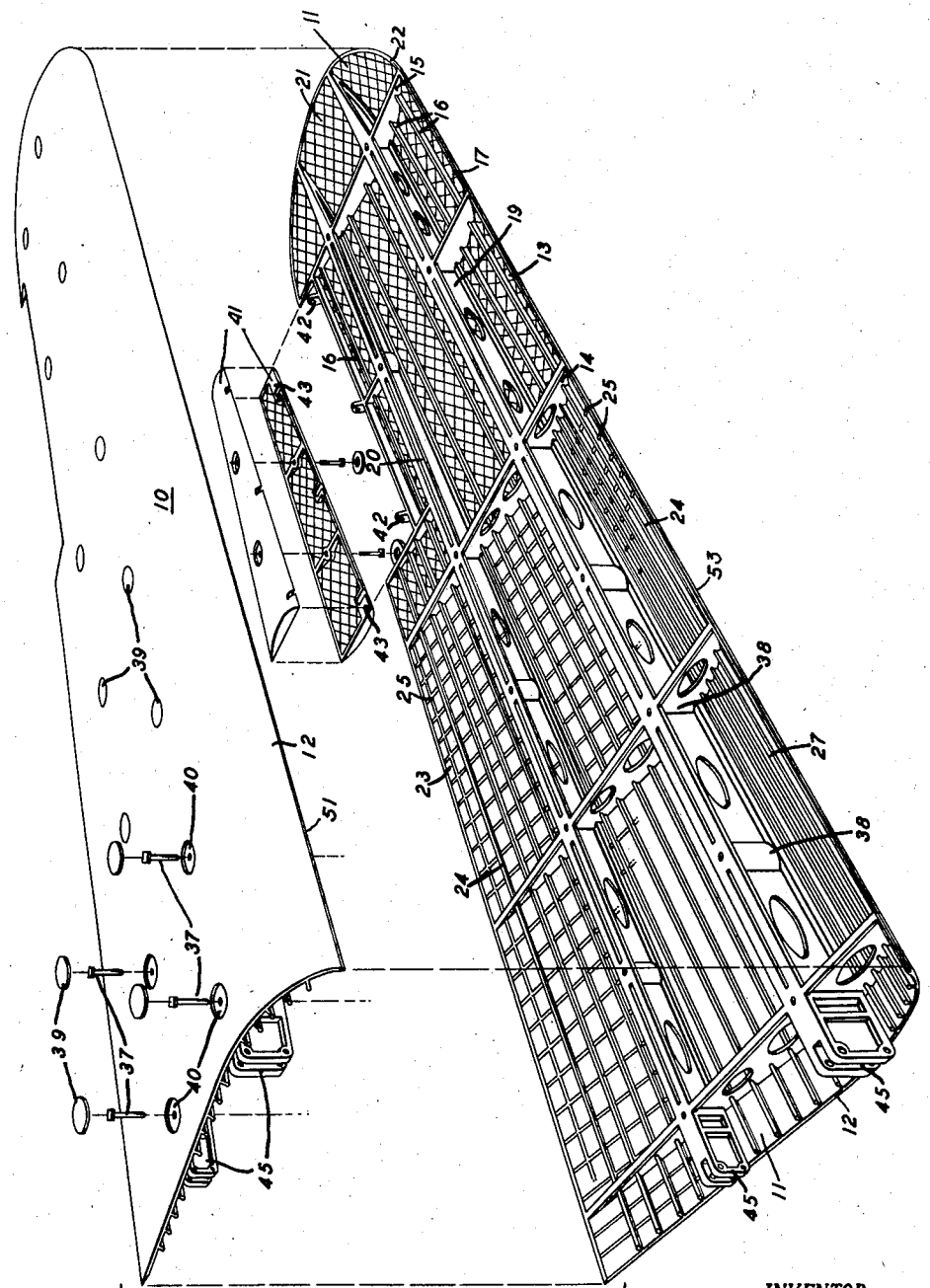
Fig. 3 is an exploded perspective view of an airplane wing, with flap and aileron, embodying the invention and formed by the method and process herein described.

In a small member such as the panel just described the stringers are the largest reinforcing element used. Where a larger surface of greater total strength is to be constructed, e.g., a complete wing such as is shown in Fig. 3, the same principle can be carried forward through successively larger channel reinforcements.

In the latter figure the reference characters 10 and 11 indicate generally the upper and lower halves respectively of a cantilever wing made in accordance with this invention.

In order to maintain a substantially uniform stress throughout the structure the skin 12 of each half tapers markedly from root to tip of the wing, and to a lesser degree from axis to the leading and trailing edges. The section 13 of the lower half, inboard from the tip, is formed in substantially the same manner as the test panel first described, but is terminated by half ribs 14 and 15 which intersect the stringers substantially at right angles and in pouring serve as channels for filling stringers 16 and beads 17. The ribs, in turn, are intersected by spars 19 and 20, of still larger section.

Outboard of the section 13, the tip section 21 is but lightly stressed; here the stringers are omitted and the beads fill directly from the spar channels and from match bead 22 which surrounds the leading edge and tip.

Inboard of the section 13, in section 23 where the skin is thicker, the diagonal beads are unnecessary to secure complete filling of the skin section, which can be adequately accomplished through the stringers 24 and a single set of beads 25. Still further inboard, in section 27 where the skin is still thicker, the beads may be omitted entirely and the skin filled directly from the spars, ribs and stringers. It will thus be seen that the members in any portion of the graduated series from spars to beads may be omitted in accordance with the duty on the particular portion of the structure under consideration, but that such omission does not change the basic feature; i.e., the division of the relatively thin skin into elementary sub-areas by reinforcing members which act as filling channels, limit shrinkage and, when the cooling is gradual, prevent tears.

The preferred material for a wing such as that shown is a magnesium base alloy of good flowing, strength and shrinkage characteristics. One such alloy is known commercially "Flylite 5," the analysis of which is as follows:

|  | Percent |
|---|---|
| Aluminum | 7.5 to 8.5 |
| Manganese | 0.2 to 0.4 |
| Zinc | 0.2 to 0.6 |
| Silicon | 0.0 to 0.3 |
| Copper | 0.0 to 0.05 |
| Nickel | 0.0 to 0.005 |
| Iron | 0.0 to 0.002 |
| Other components | None |
| Impurities | 0.03 |
| Magnesium | Remainder |

"Flylite 9" is a similar alloy having slightly more aluminum—from 9.2 to 9.8%—and a corresponding reduction in magnesium content. Other light alloys of generally similar composition may be used satisfactorily with this process for airplane or guided missile or other related forms of construction. For marine or automotive use, where extreme lightness is not so important, aluminum base alloys or bronzes can be used.

As has already been indicated the mold can be of dry sand, graphite, plaster or metal. The preferred material for castings is graphite, because of its refractory and heat conducting properties, and because the molds can be made accurately to size and re-used. In castings of large areas, such as a complete wing, the molds are made in sections 30 and accurately alined on a large flask-like table 31.

Heating elements 32 are inserted in the mold and may either be molded in situ or inserted in cored holes. The type of heating element used is unimportant; many commercial types are available, and wound resistors, "Calrod," or induction elements are examples. If the molds are of metal or graphite they may themselves form the secondaries of induction transformers, in appropriate cases, and form their own heating elements, but this is not economical for large structures like a complete wing.

Figure 4:
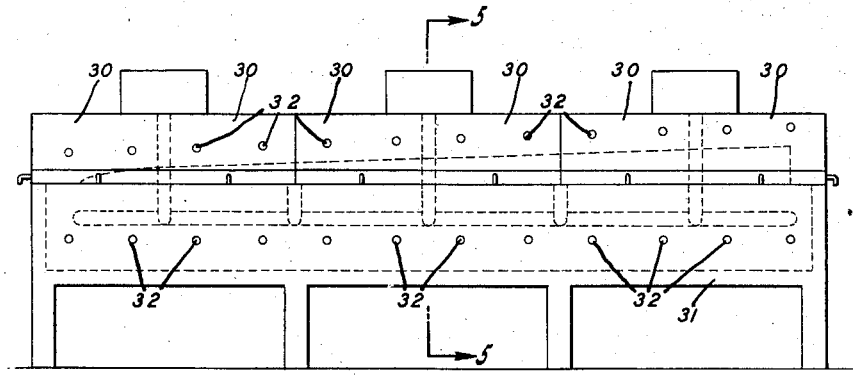
Fig. 4 is a drawing of a mold for forming structures of the type described; and, Fig. 5 is a cross-sectional view taken on the plane of the line 5—5 of Fig. 4.
Figure 5:
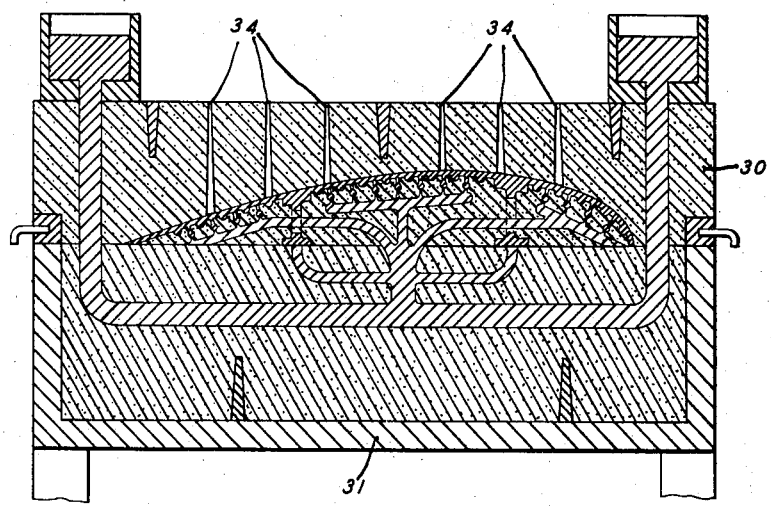

In the showing made by the drawings of this application, particularly as represented by the heating elements 32 in Fig. 4, heating of the mold can readily be achieved inductively. The induction elements are preferably formed of copper tubing (illustrated at 32 in Fig. 4) which serve effectively to heat the mold and any components therein contained when electric current is caused to flow through the tubing. The number of paths traversed within the mold by such current carrying copper tubes naturally will depend upon the amount of heating required, the size of the mold used, and the rapidity with which the mold and any therein components are to be raised to the desired temperature.

Following heating of the mold and any component therein contained and the disconnection of any current supply to the tubing this tubing serves the advantageous purpose of providing an element through which it is possible to pass either cooling liquids or in some instances a refrigerant in order to reduce (rapidly, if necessary, or gradually, where desired, but in either case at a rate quicker than would be possible by radiation) the mold temperature, and with it any contained component, to the desired room temperature. Then, following this reduction in temperature of the mold and with it the temperature of any therein component, the reheating of the formed component may be caused to occur within the mold by again passing current through the tubing to heat the entire assembly after which extremely rapid cooling can be effected and the contained component cooled to a temperature considerably below 0° F. by using the copper tubing as the coil elements of a refrigeration system.

For this re-heating process and considering that the component contained in the mold is formed, illustratively of "Flylite 5," the re-heating temperature may be brought to approximately 350° F. with the heat maintained for a period of about four hours, after which the component is cooled rapidly to a temperature of the order of −40° F. to −60° F., with the cooling period required usually being approximately two hours. Where a shorter heating time period is desired substantially the same effects can be achieved with the same alloy by re-heating to a temperature of approximately 450° F., but providing the heat for only about a period of three hours. The cooling at the stated temperature will occur over substantially the same time period.

While it has been herein explained that the elements 32 may carry refrigerants as well as cooling liquids it is usually preferably upon completion of the re-heating step, if this be done in the mold, to remove the component from the mold and then to abruptly cool in "deep freeze" at the temperature stated, so that cooling occurs in air, circulated or not, as is found appropriate for the particular component being formed.

Where other alloys are used generally similar temperatures and re-heat time periods are utilized although depending upon the particular composition of the alloy some minor variations may be desirable. Usually the cooling temperatures in the so-called "deep freeze" are approximately the same, but the re-heat temperatures and the time periods may vary within limited ranges.

Following the foregoing principles it will be appreciated that prior to forming the wing structure of Fig. 3 the mold is brought up to a temperature of about 800° F. This should be done far enough in advance to insure substantial equalization of temperature throughout the mold. When the method is used on bronze castings, instead of magnesium or aluminum alloys, the temperature should be higher, from 1000° to 1200°, depending on the alloy.

The casting is formed by flowing the alloy, while it is in a flowing or plasticized state, in any desired fashion into the mold, the gases escaping from the mold through the vents provided by the risers 34. After the alloy in a flowing or plasticized phase has been flowed into the mold, the mold temperature is reduced either by rheostat or similar control, by cutting certain of the heating elements out of the circuit, by changing from parallel to series-parallel, to series connection, by cooling through circulation of liquids or refrigerants through the tubular elements 32 or by a combination of these methods thus preparing the component for normalizing which will then give to the component maximum strength at the yield point, as already explained. When the mold temperature has been reduced to a point where no further changes in crystalline structure occur the sections of the mold can be removed or collapsed, and the casting trimmed and machined where necessary.

The operation and process herein described is from what has been above stated extremely flexible. Summarizing, after the component has been formed within the mold by flowing metal therein it is first cooled appropriately to approximately room temperature. Then, where desired, the component is re-heated, as already explained, and again cooled, but at this time cooled to a temperature considerably below zero degrees Fahrenheit. In cases where the formed component is removed from the mold prior to complete cooling to room temperature it is usually preferable to circulate air at room temperature around the component to assist in the cooling and to bring the complete component to approximately room temperature at substantially the same time. The circulated air under such circumstances and conditions is directed mainly at the regions of the formed component which have the greatest mass and therefore would normally cool more slowly. In cases where the component is formed in the mold and then cooled in any appropriate fashion to about room temperature either completely within the mold or partly within the mold and partly external to the mold and it is desired to re-heat and then rapidly cool the component in deep freeze, the component, to cool it, is placed within a refrigerating chamber with cold air as the cooling medium. In this instance, also, in order that all regions or areas of the component as a whole may reach the lowered temperature at approximately the same time the cold refrigerating air is usually circulated and directed by forced circulation upon the most massive areas of the formed component in order more rapidly to reduce the temperature thereof. The degree of cooling and the temperature to which cooling must occur following re-heating is not particularly critical, although it has been found, generally speaking, that if deep freeze cooling is relied upon cooling to temperatures in the range between −40° F. to −60° F. is usually desirable for most alloys. The suggested temperature range would be particularly suited to treatment of the alloy hereinabove defined as "Flylite 5."

The upper and lower halves of the wing of Fig. 3 are fastened together with bolts 37, which pass through bosses 38 formed in the spars and ribs. The heads of the bolts are concealed and the wing surface smoothed by cover plates 39 fitted into counter sinks 40.

Ailerons 41 for the wing described can be fabricated in the same manner as the wing itself. The hinge elements 42 on the wing and 43 on the aileron are cast integrally with the structures to which they are attached, the aileron halves being clamped together over pins preinserted in the hinge members 42. The attachments 45 to the body of the plane are also integrally cast.

In the showing of Fig. 3 the fastening of the upper and lower wing sections has been schematically identified by the dash-dash lines shown between the upper and lower sections. The actual fastening can be achieved by use of pins, bolts, rivets, screws, welding, cementing or any other construction. As illustrated, the forward edge of the upper wing section may be formed with a tongue 51 running substantially for the wing length. The lower wing section may then have a mating groove section 53 extending outwardly of the length of the wing for a like distance. When the parts are assembled in the modifications illustrated the tongue and groove sections are matched and the bolts 37 are then fastened, as already explained, to be followed by any necessary further securement of the sections, as hereinabove explained.

The decreasing dimension feature and the taper is governed largely by each detail unit design requirement. With the taper in all directions great weight saving is effected while still being consistent with ease of molding and the necessary unit strength design formed by a uniformly grained end-product structure free from internal stresses due to the normalizing treatment hereinabove explained. The process provides great flexibility of design and when assembling components makes it possible readily to fasten elements in accordance with the stress.

It is not to be inferred that every molded wing would embody all the features of the one just described, which was chosen for illustration primarily because it embodies more variants of the fundamental principles than most. In some cases the diagonal bead structure of section 13 will extend over the entire wing; in others the wholly rectangular arrangement of section 23 may be used throughout.

Somewhat surprisingly, the products of this invention are found to be particularly advantageous in ailerons, tail and rudder assemblies, etc., where past practice has used the lightest construction. This is because the very thin and flimsy sheet metal surfaces are especially difficult to hold to exact contour, and are particularly difficult to restrain against deformation in applying stiffeners, which of themselves are so small and frail as to be hard to handle. Diagonal bracing, especially advantageous in such cases, is almost impossible to apply, but by this method it becomes easy and the castings, which would ordinarily be dismissed from consideration as intrinsically too heavy, actually prove to be the lightest structure of the requisite shape and strength.

This application constitutes a continuation-in-part of application Serial No. 356,781, filed May 22, 1953, which application is now abandoned and which, in turn, is a division of the application filed September 3, 1947, by this applicant as Serial No. 771,846, now U.S. Patent 2,639,876, granted May 26, 1953, and entitled "Molded Structure." As should be apparent from the foregoing, it is not desired to limit this disclosure to the specific embodiments of the invention as illustrated herein, but to protect the invention as broadly set forth in the following claims.

Having now described the invention, what is claimed is:

1. The method of forming thin monocoque structural elements of the stressed-skin type from non-ferrous alloys which comprises the steps of forming a mold for a plate which will form the skin of the element, forming within the mold a plurality of intersecting passages at least part of which are of decreasing size and which passages communicate with the plate area to divide it into a number of relatively small areas and through which passages metal, when flowed into the mold, is adapted to fill the region which will form the skin and which passages, when filled with the metal integrally associated with the flowed skin portion, form reinforcing elements for the structure, forming a plurality of vents extending outwardly from the forward intersecting passages to vent air and other gases from the mold, preheating the mold to approach the temperature of the melting point of the alloy to form the monocoque structural element, filling the mold with the selected alloy in a molten phase, maintaining substantially the preheat temperature during the mold filling, and gradually reducing the temperature subsequent to filling to permit the poured alloy to harden in a condition free of internal stresses so as to control and equalize the crystalline grain thereof.

2. The method of forming a monocoque structural element from an alloy which comprises the steps of forming a mold for a plate to constitute the skin of the element, forming a plurality of intersecting passages located relative to each other along geodesic lines of the surface to form the skin with at least part of the passages of generally progressively decreasing cross-section from one end of the structural element to the other with the passages communicating with the plate area to divide it into a number of relatively small areas through which passages the alloy, when poured, is adapted to flow to fill the skin portions and which passages, when filled with the poured alloy, become integrally associated with the poured skin portion and form reinforcing elements for the completed structural element, forming a plurality of pencil-like vents extending outwardly from the formed passages to vent air and other gases from the mold, preheating the mold to a temperature approaching the melting point of the selected alloy with which the mold is adapted to be filled when the alloy is in a molten phase, maintaining the mold at substantially the preheat temperature during the filling process, and then gradually reducing the mold temperature subsequent to filling to permit the alloy to harden in a condition substantially free of internal stresses thereby to control and equalize the crystalline grain thereof.

3. The method of forming thin monocoque structural elements from non-ferrous alloys which comprises the steps of forming a mold for a plate adapted to constitute the skin of the member, forming within the mold area a plurality of intersecting passages located relative to each other along geodesic lines of the surface at least a part of which passages are of progressively decreasing size in at least the cross-sectional width and depth, the passages communicating with the plate area and dividing it into a plurality of relatively small areas through which passages the alloy, when poured in a molten state, is adapted to flow to fill the skin portions and which passages when filled with metal integrally associated with the poured skin portion form reinforcing elements for the completed plate, forming a plurality of pencil-like vents extending outwardly through the mold from the formed passages to vent air and other gases from the mold during pouring, preheating the mold to a temperature approaching the melting point of the selected alloy with which the mold is to be filled, filling the mold with the so-selected alloy in its molten phase to inject the alloy at the largest reinforcing channel, maintaining the preheat temperature of the mold during the filling process, and thereafter gradually reducing the mold temperature to permit the molded alloy to harden in a condition substantially free of internal stresses whereby equalization of the crystalline grain structure of the poured alloy is achieved.

4. The method claimed in claim 3 comprising, in addition, the steps of removing the mold from the poured formed monocoque structure subsequent to cooling, then cutting from the formed structure any hardened alloy stubs extending into the vent region, and smoothing the surface at the point of stub removal to form a substantially continuous coplanar surface with respect to the skin structure formed.

5. The method of forming thin monocoque structural elements of the stressed-skin type from non-ferrous alloys which comprises the steps of forming a mold for a plate which will form the skin of the element, forming within the mold a plurality of intersecting passages at least part of which are of decreasing size and which passages communicate with the plate area to divide it into a number of relatively small areas and through which passages metal, when flowed into the mold, is adapted to fill the region which will form the skin and which passages, when filled with the metal integrally associated with the flowed skin portion, form reinforcing elements for the structure, forming a plurality of vents extending outwardly from the forward intersecting passages to vent air and other gases from the mold, preheating the mold to approach the temperature of the melting point of the alloy to form the monocoque structural element, filling the mold with the selected alloy in a molten phase, maintaining substantially the preheat temperature during the mold filling gradually reducing the temperature subsequent to filling to permit the poured alloy to harden, removing the structure from the mold after hardening, re-heating the structure to a normalizing temperature, and then cooling the structure to a substantially normalized condition free of internal stresses so as to control and equalize the crystalline grain thereof.

6. The method of forming a monocoque structural element from an alloy which comprises the steps of forming a mold for a plate to constitute the skin of the element, forming a plurality of intersecting passages located relative to each other along geodesic lines of the surface to form the skin with at least part of the passages of generally progressively decreasing cross-section from one end of the structural element to the other with the passages communicating with the plate area to divide it into a number of relatively small areas through which passages the alloy, when poured, is adapted to flow to fill the skin portions and which passages, when filled with the poured alloy, become integrally associated with the poured skin portion and form reinforcing elements for the completed structural element, forming a plurality of pencil-like vents extending outwardly from the formed passages to vent air and other gases from the mold, preheating the mold to a temperature approaching the melting point of the selected alloy with which the mold is adapted to be filled when the alloy is in a molten phase, maintaining the mold at substantially the preheat temperature during the filling process, then gradually reducing the mold temperature subsequent to filling to permit the alloy to harden, removing the structure from the mold after hardening, re-heating the structure to a normalizing temperature, and then cooling the structure to a substantially normalized condition substantially free of internal stresses thereby to control and equalize the crystalline grain thereof.

7. The method of forming thin monocoque structural elements from non-ferrous alloys which comprises the steps of forming a mold for a plate adapted to constitute the skin of the member, forming within the mold area a plurality of intersecting passages located relative to each other along geodesic lines of the surface at least a part of which passages are of progressively decreasing size in at least the cross-sectional width and depth, the passages communicating with the plate area and dividing it into a plurality of relatively small areas through which passages the alloy, when poured in a molten state, is adapted to flow to fill the skin portions and which passages when filled with metal integrally associated with the poured skin portion form reinforcing elements for the completed plate, forming a plurality of pencil-like vents extending outwardly through the mold from the formed passages to vent air and other gases from the mold during pouring, preheating the mold to a temperature approaching the melting point of the selected alloy with which the mold is to be filled, filling the mold with the so selected alloy in its molten phase to inject the alloy at the largest reinforcing channel, maintaining the preheat temperature of the mold during the filling process and thereafter gradually reducing the mold temperature to permit the molded alloy to harden, removing the structure from the mold after hardening, re-heating the structure to a normalizing temperature, and then cooling the structure to a substantially normalized condition substantially free of internal stresses whereby equalization of the crystalline grain structure of the poured alloy is achieved.

8. The method claimed in claim 7 comprising, in addition, the steps of removing the mold from the poured formed monocoque structure subsequent to cooling, then cutting from the formed structure any hardened alloy stubs extending into the vent region and smoothing the surface at the point of stub removal to form a substantially continuous coplanar surface with respect to the skin structure formed, then re-heating to a normalizing temperature, and later cooling to a substantially normalized state substantially free of internal stresses, thereby to control and equalize the crystalline grain structure.

9. The method of forming thin monocoque structural elements of the stressed-skin type from non-ferrous alloys which comprises the steps of forming a mold for a plate which will form the skin of the element, forming within the mold a plurality of intersecting passages at least part of which are of decreasing size and which passages communicate with the plate area to divide it into a number of relatively small areas and through which passages metal, when flowed into the mold, is adapted to fill the region which will form the skin and which passages, when filled with the metal integrally associated with the flowed skin portion, form reinforcing elements for the structure, forming a plurality of vents extending outwardly from the forward intersecting passages to vent air and other gases from the mold, preheating the mold to approach the temperature of the melting point of the alloy to form the monocoque structural element, filling the mold with the selected alloy in a plasticized phase, maintaining substantially the preheat temperature during the mold filling, and gradually reducing the temperature subsequent to filling to permit the poured alloy to harden in a condition free of internal stresses so as to control and equalize the crystalline grain thereof.

References Cited in the file of this patent

UNITED STATES PATENTS

| 976,464 | De La Hunty | Nov. 22, 1910 |
| 2,287,848 | Wessel | June 30, 1942 |

FOREIGN PATENTS

| 106,489 | Australia | Jan. 24, 1939 |

OTHER REFERENCES

Henderson: Metallurgical Dictionary (page 225), 1953.